United States Patent [19]

Abe et al.

[11] Patent Number: 4,806,751

[45] Date of Patent: Feb. 21, 1989

[54] CODE WHEEL FOR A REFLECTIVE TYPE OPTICAL ROTARY ENCODER

[75] Inventors: Hiraku Abe; Yoshihiro Takahashi; Yoji Shimojima, all of Furukawa, Japan

[73] Assignee: Alps Electric Co., Ltd., Japan

[21] Appl. No.: 213,468

[22] Filed: Jun. 29, 1988

Related U.S. Application Data

[63] Continuation of Ser. No. 911,237, Sep. 24, 1986, abandoned.

[30] Foreign Application Priority Data

Sep. 30, 1985 [JP] Japan .................. 60-148089[U]

[51] Int. Cl.⁴ ......................................... G01D 5/34
[52] U.S. Cl. ........................................ 250/231 SE
[58] Field of Search ............... 250/231 SE, 237 G; 340/347 P; 356/373–375; 29/572, 578

[56] References Cited

U.S. PATENT DOCUMENTS

4,400,443 8/1983 Green ..................... 250/231 SE
4,644,156 2/1987 Takahashi et al. ........ 250/231 SE

*Primary Examiner*—Edward P. Westin
*Attorney, Agent, or Firm*—Guy W. Shoup; Paul J. Winters

[57] ABSTRACT

A code wheel for use with a reflective type optical rotary encoder which can be produced easily and optically read efficiently. The code wheel includes a non-reflective plate, and a reflective plate having a suitable number of notches formed along a periphery thereof and mounted in an overlapping relationship on the non-reflective plate whereby a reflective portion of the code wheel is formed by a face of the reflective plate between each two adjacent notches while a non-reflective portion is formed by a face of the non-reflective plate exposed through the corresponding notch of the reflective plate.

1 Claim, 1 Drawing Sheet

CODE WHEEL FOR A REFLECTIVE TYPE OPTICAL ROTARY ENCODER

This application is a continuation of application Ser. No. 911,237 filed Sept. 24, 1986 now abandoned.

BACKGROUND OF THE INVENTION

This invention relates to a code wheel for use with a reflective type optical rotary encoder.

Reflective type optical rotary encoders are already known wherein information of a rotating body such as a rotational frequency and a direction of rotation is determined from a beam of light which is irradiated upon and reflected from reflective portions and non-reflective portions provided on a code wheel. An example of such a code wheel will be described below with reference to FIGS. 4 and 5.

FIG. 4 is a perspective view showing general construction of a rotary encoder, and FIG. 5 is a plan view of a code wheel. Referring to FIGS. 4 and 5, a code wheel 2 in the form of a disk is mounted on a shaft 1a of a motor 1. The code wheel 2 has a plurality sectoral reflective portions 3 arranged radially in a circumferentially equidistantly spaced relationship on a flat face 2a thereof, and a plurality of of non-reflective portions 4 each located between adjacent ones of the reflective portions 3. A light emitting element 5 and a pair of light receiving elements 6 and 7 located on opposite sides of the light emitting element 5 are disposed in an optically aligned relationship to the flat face 2a of the code wheel 2 by way of optical fibers 8, 9 and 10, respectively. Thus, as the code wheel 2 rotates, a beam of light from the light emitting element 5 is reflected from the reflective portions 3 and received by the pair of light receiving elements 6 and 7 as a pair of series of pulse signals from which a rotational frequency and a direction of rotation of the code wheel 2 can be determined as well known in the art.

As seen from FIG. 5, the code wheel 2 is composed of a disk member made of a metal material such as aluminum on a surface of which the radial, equidistantly spaced, sectoral non-reflective portions 4 are formed by printing using ink of a resin material which contains therein a black, light absorbing substance such as carbon black. Meanwhile, the reflective portions 3 of the code wheel 2 are formed by exposed portions of a surface of the disk member itself of a metal material which has been treated to increase the light reflectivity and provide an anticorrosive feature.

However, such a process of producing the conventional code wheel 2 as described above has a drawback that the production cost is high because the non-reflective portions 4 are formed using a printing technique. Besides, it is another drawback of the process that the light absorbing efficiency decreases as the flatness of the black printed faces of resin ink increases.

SUMMARY OF THE INVENTION

It is an object of the present invention to provide a code wheel for use with a reflective type optical rotary encoder which eliminates such drawbacks of the prior art technique as described above and can be produced easily and optically read efficiently.

In order to attain the object, according to the present invention, a code wheel for a reflective type optical rotary encoder wherein information such as a rotational frequency and a direction of rotation is determined from a beam of light which is irradiated upon and reflected from reflective portions and non-reflective portions provided on a code wheel comprises a non-reflective plate having a light absorbing function, and a reflective plate having an arbitrary number of notches formed along a periphery thereof and mounted in an overlapping relationship on the non-reflective plate whereby the reflective portions are each formed by a face of a portion of the reflective plate between adjacent ones of the notches while the non-reflective portions are each formed by a face of a portion of the non-reflective plate which is exposed through one of the notches of the reflective plate.

Thus, non-reflective portions and reflective portions of a code wheel can be formed easily and at a reduced production cost, as different from those formed using a printing technique. Besides, planes of light incoming faces of the reflective portions and the non-reflective portions can be spaced by a distance from each other to increase the difference in light reflectivity between the reflective portions and the non-reflective portions of the code wheel. Accordingly, a code wheel for use with a reflective type optical rotary encoder which assures more efficient optical reading thereof can be provided.

DESCRIPTION OF THE PREFERRED EMBODIMENT

Figure 1:
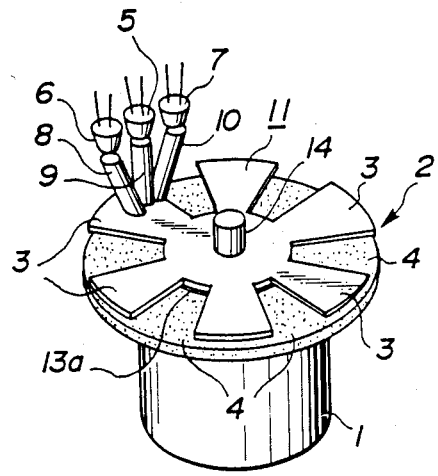
FIG. 1 is a perspective view showing an optical rotary encoder according to an embodiment of the present invention.

Now, an embodiment of the present invention will be described with reference to the drawing.

Figure 4:
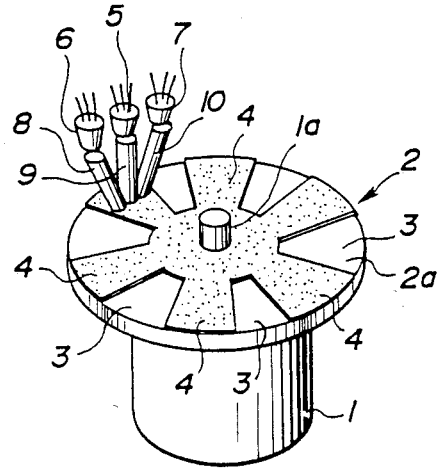
FIG. 4 is a perspective view of a typical one of conventional optical rotary encoders.
Figure 2:
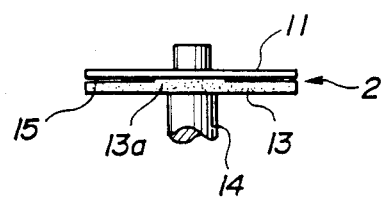
FIG. 2 is a side elevational view of a code wheel of the optical rotary encoder of FIG. 1.
Figure 3:
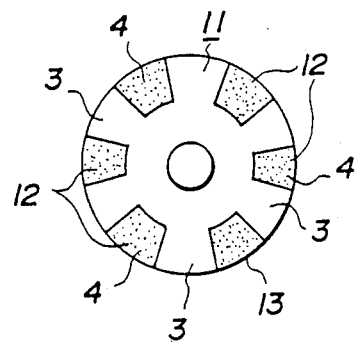
FIG. 3 is a plan view of the code wheel of FIG. 2.
Figure 5:
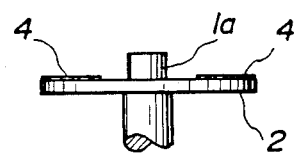
FIG. 5 is a side elevational view of a code wheel of the conventional optical rotary encoder of FIG. 4.

Referring to FIGS. 1 to 3, like members described with reference to FIGS. 4 adn 5 are designated by like reference numerals.

Only one difference of the present embodiment from the prior art device as described above resides in construction of a code wheel 2. In particular, a reflective plate 11 which provides reflective portions 3 is constituted from a flat plate of a metal material such as aluminum which is recessed along a periphery thereof by a suitable means to form an arbitrary number of notches 12 with metal portions left between the notches 12 to form the reflective portions 3. Meanwhile, a non-reflective plate 13 in the form of a disk which provides non-reflective portions 4 having a light absorbing function is a molded body made of a synthetic resin material containing therein a light absorbing substance such as carbon black and has a swell 13a formed around the center thereof.

The reflective plate 11 is placed on the non-reflective plate 13 and supported in a coaxial relationship with the non-reflective plate 13 on a support shaft 14. In this instance, a gap 15 is formed between the reflective plate 11 and the non-reflective plate 13 due to the presence of the swell 13a. The gap 15 serves as an escape for chips which may be formed when the notches 12 of the reflective plate 11 are formed.

The code wheel 2 of the present embodiment can be produced easily by mechanical working as described above and can thus be reduced in cost.

Now, operation of a rotary encoder which employs the code wheel 2 described above will be described. Referring to FIG. 1, the support shaft 14 for the code wheel 2 is secured to a shaft of a motor 1, and a light emitting element 5 and a pair of light receiving elements 6 and 7 located on opposite sides of the light emitting element 5 are arranged in an optically aligned relationship to a face of the code wheel 2 on which the reflective portions 3 and the non-reflective portions 4 are located by way of optical fibers 8, 9 and 10, respectively.

Thus, as the code wheel 2 rotates, a beam of light from the light emitting element 5 is reflected by the reflective portions 3 of the code wheel 2 and received as a pair of series of pulse signals by the pair of light receiving elements 6 and 7 whereby a rotational frequency and a direction of rotation of the code 2 are detected.

Here, the light receiving efficiency of the light receiving elements 6 and 7 will be examined. Because the reflective plate 11 is placed in an overlapping relationship on the non-reflective plate 13, planes of light incident faces of the reflective portions 3 and the non-reflective portions 4 are spaced from each other by a distance corresponding to a distance of the gap 15 added by a thickness of material of the reflective plate 11, and otherwise where the gap 15 can be ignored, by a distance corresponding to a thickness of material of the reflective plate 11, resulting in difference in an angle of reflection of the incident light and hence in reduction of the quantity of light reflected by the non-reflective portions 3 of the code wheel 2 and received by the light receiving elements 6 and 7.

Accordingly, there is a great difference in light reflectivity between the reflective portions 3 and the non-reflective portions 4 of the code wheel 2, and hence there is a great difference between a high level and a low level of pulse signals produced from the light receiving elements 6 and 7. Consequently, the detecting sensitivity of the optical rotary encoder is improved.

It is to be noted that, in order to further increase the difference in light reflectivity as described above, surfaces of the non-reflective portions 4 of the code wheel 2 may be treated to provide a satin crape like appearance by sand-blasting or the like to improve the irregular reflectivity of the same.

What is claimed is:

1. In a code wheel for a reflective type optical rotary encoder in which information such as rotational speed and direction of rotation is determined using a beam of light of a light emitting and detecting means which is irradiated upon and reflected from reflective portions and absorbed by nonreflective portions provided on one side of the code wheel, the improvement wherein said code wheel comprises:

a nonreflective plate having a light absorbing function;

a reflective plate of a predetermined thickness having a reflective surface on one side thereof and a plurality of notches formed though the thickness of said reflective plate circumferentially along a periphery thereof, said reflective plate being mounted overlappingly on said nonreflective plate, wherein said reflective portions are formed by portions of the reflective surface of said reflective plate between adjacent ones of said notches, while said nonreflective portions are formed by portions of said nonreflective plate exposed through said notches in said reflective plate, and wherein said nonreflective plate has formed around a center axis thereof a protrusion of a predetermined height on which said reflective plate is mounted so that a gap is formed between said nonreflective plate and said reflective plate, and said reflective portions have their light reflective surfaces lying in one plane closer to the light emitting and detecting means which is spaced by a selected spacing from said nonreflective portions in an axial direction of said code wheel, said selected spacing being formed by the thickness of said reflective plate added to the height of said protrusion, whereby any light nominally reflected from said nonreflective portions is reduced due to said selected spacing in the axial direction provided between said reflective portions and said nonreflective portions, and the difference in light reflectivity between said portions is enhanced and the detecting sensitivity of the optical rotary encoder is improved.

* * * * *